(12) United States Patent
Huang (10) Patent No.: US 8,369,075 B2
(45) Date of Patent: Feb. 5, 2013

(54) FOLDABLE ELECTRONIC DEVICE

(75) Inventor: Yi Di Huang, Taipei County (TW)

(73) Assignee: MSI Computer (Shenzhen) Co., Ltd., Shenzhen, Guangdong Province (CN)

( * ) Notice: Subject to any disclaimer, the term of this patent is extended or adjusted under 35 U.S.C. 154(b) by 212 days.

(21) Appl. No.: 12/887,976

(22) Filed: Sep. 22, 2010

(65) Prior Publication Data

US 2012/0033354 A1   Feb. 9, 2012

(30) Foreign Application Priority Data

Aug. 4, 2010   (TW) ............................... 99214925 U (51) Int. Cl.
*G06F 1/16*   (2006.01)

(52) U.S. Cl. ................... 361/679.21; 345/173; 349/158; 248/297.2; 428/107

(58) Field of Classification Search .................... 345/1.3, 345/102, 60, 87, 156, 173, 501, 204, 157, 345/172; 349/58, 122, 60, 65, 67, 61, 158, 349/149, 117; 248/231.91, 243, 297.2, 122.1, 248/27.3, 125.9, 638; 361/679.27, 679.55, 361/679.01, 679.21, 679.28, 679.33, 679.4, 361/679.31, 679.51, 679.48, 679.37, 679.39; 455/575.1, 575.2, 575.3, 556.2, 566, 414.1; 428/195.1, 329, 323, 107, 192, 141

See application file for complete search history.

(56) References Cited

U.S. PATENT DOCUMENTS

| | | | | |
|---|---|---|---|---|
| 7,426,107 | B2 * | 9/2008 | Yeh et al. | 361/679.27 |
| 7,667,959 | B2 * | 2/2010 | Pelkonen | 361/679.27 |
| 7,714,801 | B2 * | 5/2010 | Kimmel | 345/1.3 |
| 2009/0147469 | A1 * | 6/2009 | Chen et al. | 361/679.55 |

FOREIGN PATENT DOCUMENTS

| | | |
|---|---|---|
| TW | I235905 | 7/2005 |
| TW | 433471 | 5/2007 |
| TW | M313393 | 6/2007 |

* cited by examiner

*Primary Examiner* — Hung Duong
(74) *Attorney, Agent, or Firm* — Morris Manning & Martin LLP; Tim Tingkang Xia, Esq.

(57) ABSTRACT

A foldable electronic device includes a foldable casing and a flexible display. The flexible display is disposed in the foldable casing, and is connected to the foldable casing through an elastic member, and the elastic member provides the flexible display the extending flexibility when being unfolded or folded together with the foldable casing, such that the flexible display is capable of being used as a display screen of the foldable electronic device.

3 Claims, 9 Drawing Sheets

FOLDABLE ELECTRONIC DEVICE

CROSS-REFERENCE TO RELATED APPLICATIONS

This non-provisional application claims priority under 35 U.S.C. §119(a) on Patent Application No(s). 099214925 filed in Taiwan, R.O.C. on Aug. 4, 2010, the entire contents of which are hereby incorporated by reference.

BACKGROUND OF THE INVENTION

1. Field of Invention

The present invention relates to a foldable electronic device, and more particularly to a foldable electronic device with a flexible display as a display screen.

2. Related Art

In recent years, with the rapid development of technology and information, manufacturing technologies of electronic products are also improved gradually. In consideration of the pursuit of portability and practicability, the electronic products develop towards being light, thin, short, and small. For example, screens have developed from early large-volume and large-weight cathode ray tube (CRT) displays to light-weight and thin-volume liquid crystal display (LCD) displays. Moreover, due to the pursuit of small size of electronic products for convenient carrying, the size of displays gets smaller relatively. However, common displays generally cannot have convenience in carrying and comfort in use at the same time, that is, when the screen gets smaller and can be easily carried, the area of the screen is reduced correspondingly, such that the content of the screen frame is reduced, and is inconvenient for the user for watching. In order to solve this problem, foldable electronic screens are developed, that is, a plurality of small-size displays are combined into a large-size screen, but joints are generated between the displays, and thus the frame quality is deteriorated.

Therefore, flexible displays, for example, electronic paper or organic light-emitting diodes (OLED) displays, have been developed, and are available in the market. However, presently, the flexible displays applied on electronic devices for the purpose of reducing the volume are in the manner of rolling. The flexible displays in the manner of rolling can overcome the disadvantage of deteriorated frame quality caused by combining a plurality of small-size displays into a large-size screen. However, the flexible display has a requirement of minimal bending curvature when being rolled up, and due to excessive small curvature, the flexible display has a fold, and cannot display normally when being unfolded again, so the flexible display cannot be rolled up to be excessively small. When the flexible display is applied in a foldable electronic product, as the flexible display needs to have a radius of the minimal bending curvature, the flexible display will be bent along a shaft having a radius greater than the minimal bending curvature. When the flexible display is bent along the shaft, it will be stretched by a casing at two ends of the flexible display due to extension, such that the problem of tearing and damage of the flexible display due to the influence of stretching tension occurs. Therefore, the conventional design cannot solve the problem, and the flexible display cannot be implemented on the current foldable electronic products.

SUMMARY OF THE INVENTION

Accordingly, the present invention is a foldable electronic device, so as to solve the problem of generation of creases and tearing when a flexible display is applied in a foldable electronic device existing in the prior art.

The present invention provides a foldable electronic device, which comprises a foldable casing, a flexible display, and at least one elastic member. The foldable casing is capable of being unfolded or folded, and the flexible display is disposed in the foldable casing, and is capable of being unfolded or folded together with the foldable casing. Furthermore, the elastic member connects the foldable casing and the flexible display, so as to provide the flexible display the extending flexibility when being unfolded or folded.

The foldable electronic device comprises two elastic members, and the two elastic members connects two opposite ends of the foldable casing and the flexible display, so as to provide the flexible display the extending flexibility when being unfolded or folded.

In the foldable electronic device of the present invention, the foldable casing has at least two casing bodies, and the two casing bodies are pivoted to each other, and are capable of being unfolded and folded with respect to each other. When the two casing bodies are unfolded with respect to each other, a bearing range is formed thereby, and the flexible display is disposed on the bearing range.

In the foldable electronic device according to the present invention, the foldable casing has three casing bodies, and the three casing bodies are pivoted to each other, and are capable of being unfolded and folded with respect to each other. When the three casing bodies are unfolded with respect to each other, a bearing range is formed thereby, and the flexible display is disposed on the bearing range.

In the foldable electronic device according to the present invention, the flexible display is capable of being unfolded or folded together with the foldable casing. However, when being in a folded state, the foldable casing applies a stretching stress on the flexible display, thus forcing the flexible display to extend. Therefore, in the foldable electronic device, an elastic member is disposed to connect the flexible display and the foldable casing, so as to provide the flexible display the extending flexibility when being unfolded or folded. That is to say, the flexible display is enabled to have extensibility through the coordination of the elastic member, thus avoiding the risk of being stretched by the stress of the foldable casing and being torn and damaged. Therefore, the present invention solves the problems and applies the flexible display in the foldable electronic device to achieve the efficacy of having a minimal volume when being folded and having a maximal display screen when being unfolded.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1A:
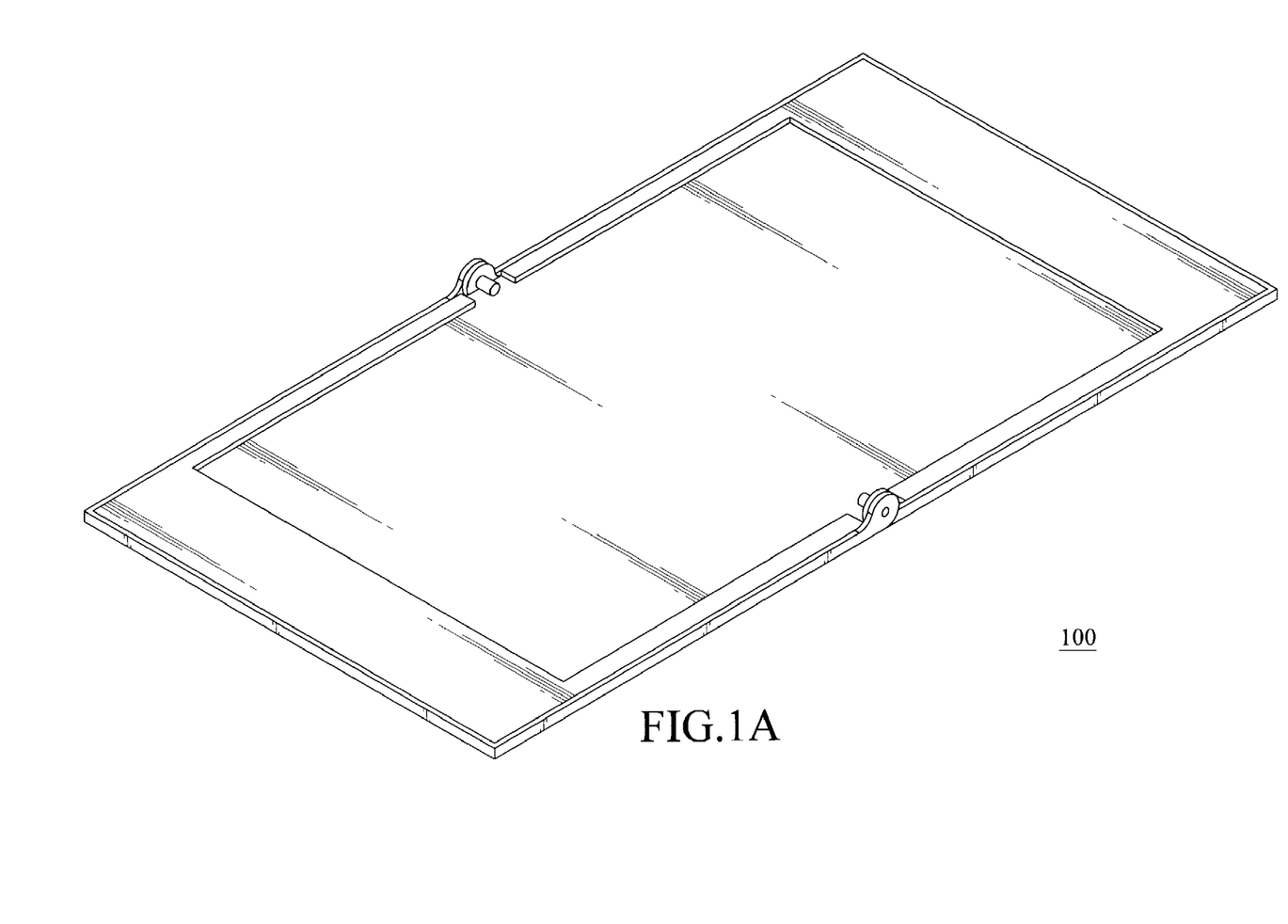
FIG. 1A is a schematic view of a foldable electronic device according to an embodiment of the present invention.
Figure 1B:
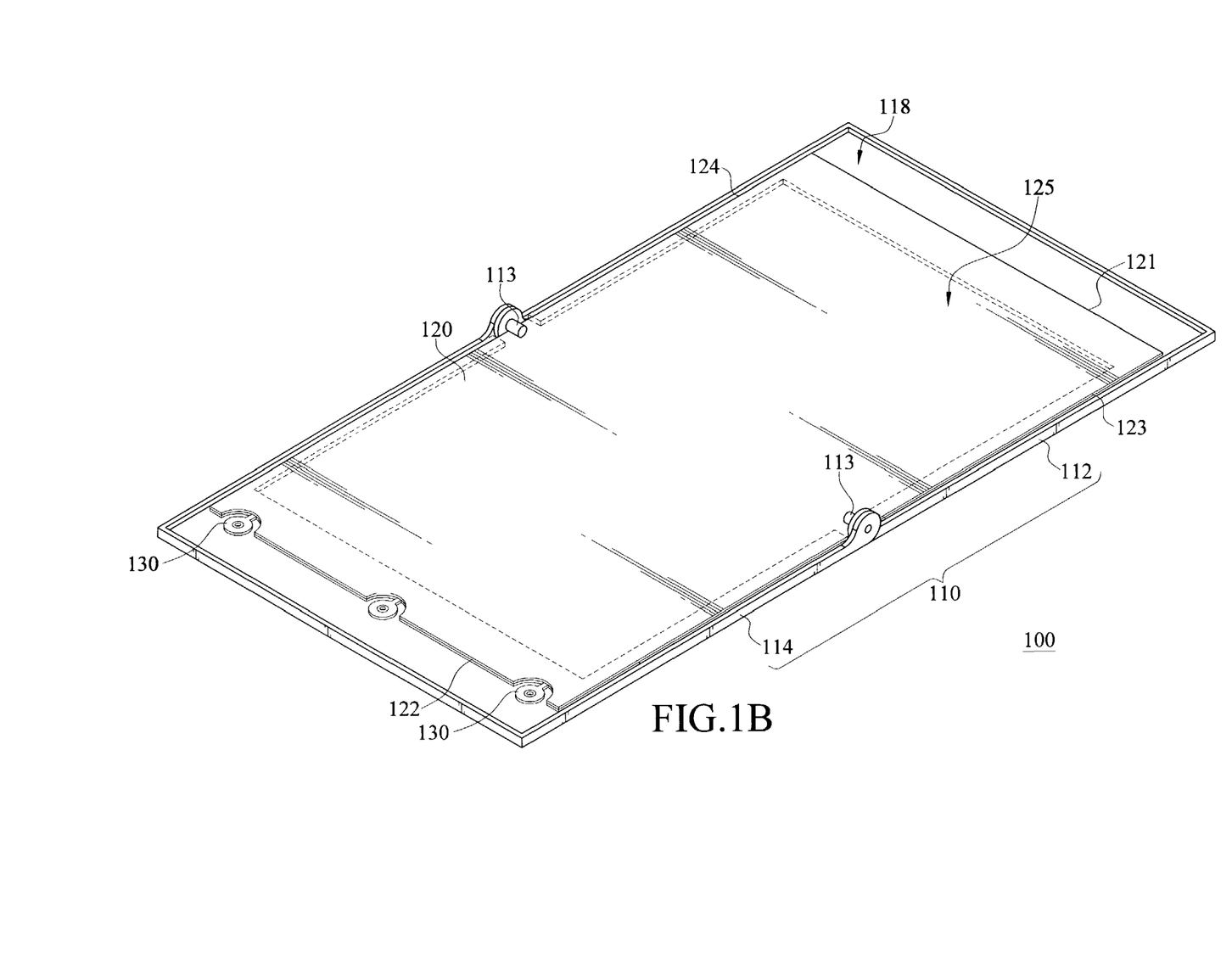
FIG. 1B is a schematic structural view of a foldable electronic device according to an embodiment of the present invention.

FIG. 1A is a schematic view of a foldable electronic device according to an embodiment of the present invention, and FIG. 1B is a schematic structural view of a foldable electronic device according to an embodiment of the present invention. Referring to FIGS. 1A and 1B, a foldable electronic device 100 comprises a foldable casing 110, a flexible display 120, and three elastic members 130. The foldable casing 110 comprises a first casing body 112, a second casing body 114, and two first pivots 113. The first pivot 113 connects the first casing body 112 and the second casing body 114, such that the first casing body 112 and the second casing body 114 are capable of being unfolded or folded with respect to each other. Moreover, when the first casing body 112 and the second casing body 114 are unfolded with respect to each other, a bearing range 118 is formed thereby. Furthermore, the flexible display 120 is disposed on the bearing range 118, and the flexible display 120 has a shape of rectangular plate, but is not limited thereto. The flexible display 120 has a first edge 121, a second edge 122 opposite to the first edge 121, a third edge 123, and a fourth edge 124 opposite to the third edge 123. The first edge 121 is connected to the first casing body 112, and the second edge 122 is connected to the three elastic members 130. The third edge 123 and the fourth edge 124 are adjacent to the two first pivots 113 respectively, but are not connected to the first casing body 112 or the second casing body 114. Therefore, only the first edge 121 of the flexible display 120 is constrained in the foldable casing 110. Although the second edge 122 is constrained on the elastic member 130, as the elastic member 130 is elastic, the second edge 122 is capable of moving relatively. That is to say, the flexible display 120 is disposed on the bearing range 118 in a floating manner. Furthermore, the flexible display 120 further has a display surface 125, the first edge 121, the second edge 122, the third edge 123, and the fourth edge 124 surrounds the display surface 125, and the display surface 125 is disposed with its back facing the foldable casing 110 and is pressed against the first pivot 113. The flexible display 120 is capable of being unfolded or folded together with the foldable casing 110. Furthermore, one end of the three elastic members 130 is connected to the second edge 122 of the flexible display 120, and the other end is fixed on the second casing body 114. The elastic member 130 provides the flexible display 120 extending flexibility when being unfolded or folded.

Figure 2A:
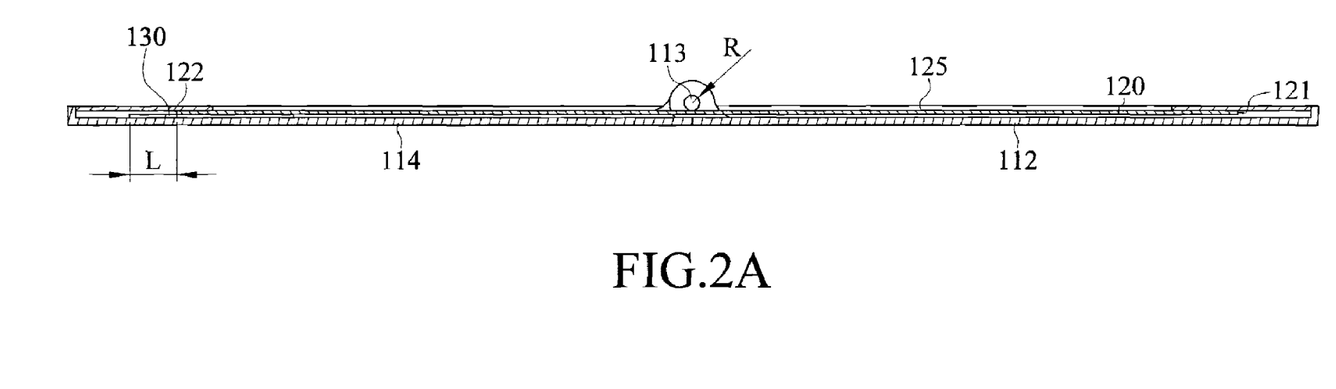
FIG. 2A is a plane cross-sectional view of the foldable electronic device in FIG. 1.
Figure 2B:
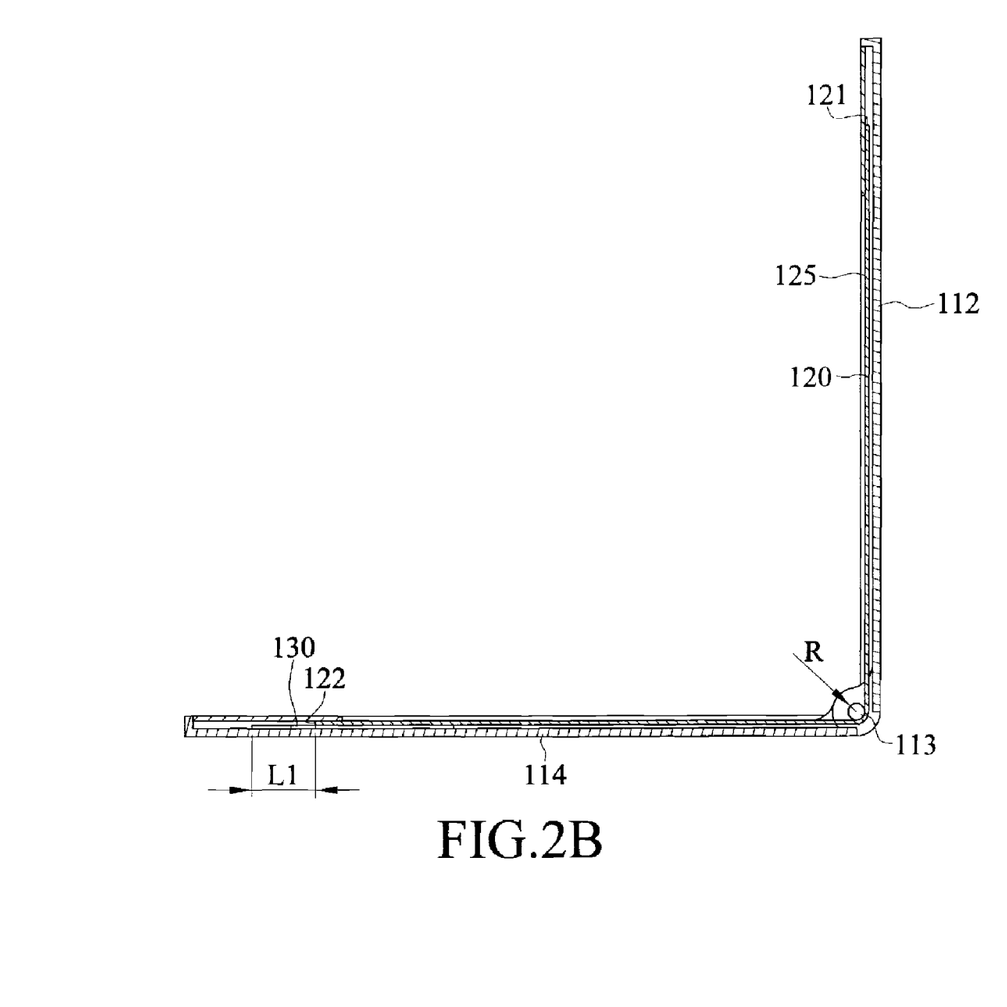
FIG. 2B is a side view of a first casing body in FIG. 2A bent for 90 degrees with respect to a second casing body.
Figure 2C:
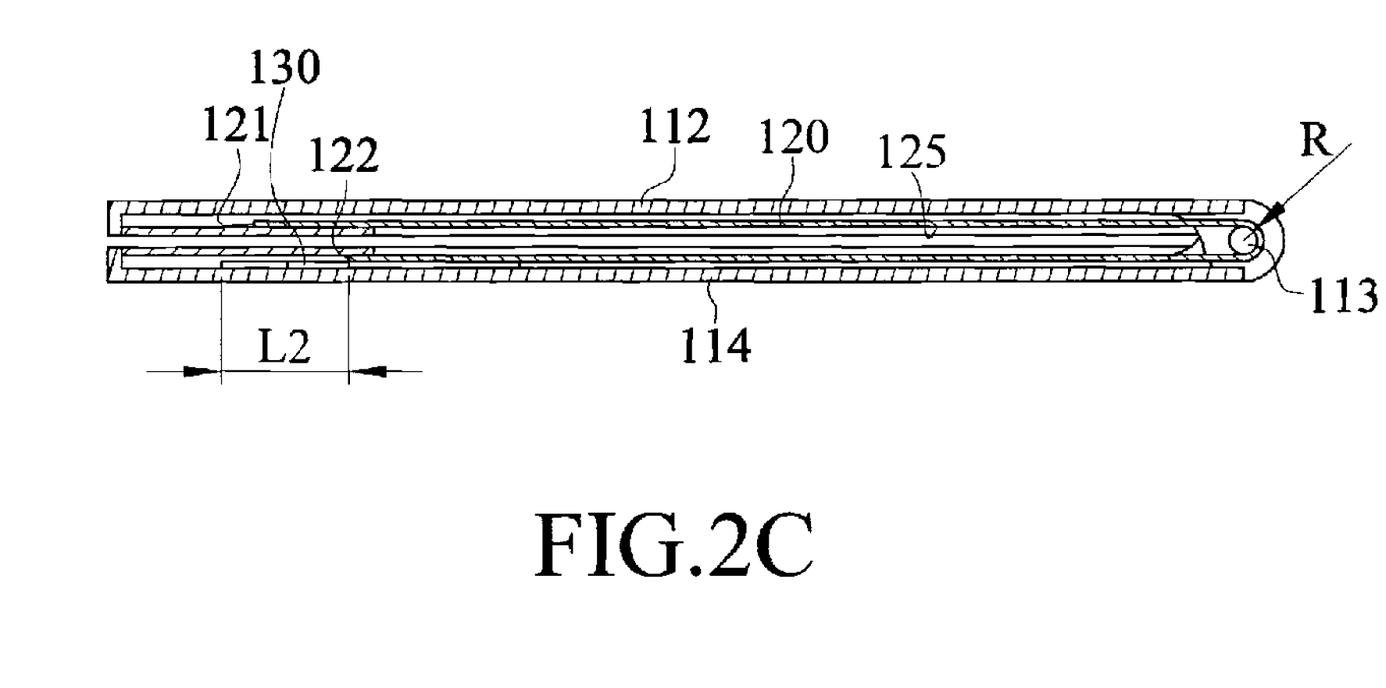
FIG. 2C is a side view of the first casing body in FIG. 2A bent for 180 degrees with respect to the second casing body.

The flexible display 120 is bent along the first pivot 113, since the first pivot 113 has an axis radius, the flexible display 120 is forced to stretched by the foldable casing 110 when being bent along the axis radius, and at this time, the elastic member 130 provides the stretching amount, so as to prevent the flexible display 120 from being torn due to stretching. The stretching length variation of the elastic member 130 will be described in detail below. FIG. 2A is a plane cross-sectional view of the foldable electronic device in FIG. 1, FIG. 2B is a side view of a first casing body in FIG. 2A bent for 90 degrees with respect to a second casing body, and FIG. 2C is a side view of the first casing body in FIG. 2A bent for 180 degrees with respect to the second casing body. The display surface 125 of the flexible display 120 is pressed against the first pivot 113, only the first edge 121 is fixed on the first casing body 112, and the second edge 122 is connected to one end of the elastic member 130. The other end of the elastic member 130 is fixed on the second casing body 114. Therefore, only two opposite edges (the first edge 121 and the second edge 122) of the flexible display 120 are constrained. At this time, the elastic member 130 has an initial length L, and the first pivot 113 has an axis radius length R.

Next, the first casing body 112 performs a counter-clockwise circular motion with respect to the second casing body 114 and rotates for 90 degrees by taking the axis of the first pivot 113 as the center of circle, as shown in FIG. 2B. At this time, the first edge 121 of the flexible display 120 is fixed to the first casing body 112, and the flexible display 120 is pressed against the first pivot 113, such that the flexible display 120 is driven by the first casing body 112 to be bent and slide along the first pivot 113. As the first casing body 112 rotates for 90 degrees, the sliding amount of the flexible display 120 on the first pivot 113 is a quarter of the circumference of the first pivot 113, that is, $2\pi R/4$, such that the second edge 122 is driven to move for a distance of $2\pi R/4$ towards the first pivot 113. The elastic member 130 is stretched by the second edge 122 and is elongated to a first folding length L1. The relation between the first folding length L1 and the initial length L is as shown in the following formula:

$$L1 = L + 2\pi R/4 = L + \pi R/2.$$

Furthermore, the first casing body 112 performs a counter-clockwise circular motion with respect to the second casing body 114 and rotates for 180 degrees by taking the axis of the first pivot 113 as the center of circle, as shown in FIG. 2C. At this time, the first edge 121 of the flexible display 120 is fixed to the first casing body 112, and the flexible display 120 is pressed against the first pivot 113, such that the flexible display 120 is driven by the first casing body 112 and is bent and slides along the first pivot 113. As the first casing body 112 rotates for 180 degrees, the sliding amount of the flexible display 120 on the first pivot 113 is a half of the circumference of the first pivot 113, that is, $2\pi R/2$, such that the second edge 122 is driven to move for a distance of $2\pi R/2$. The elastic member 130 is stretched by the second edge 122 and is elongated to a second folding length L2. The relation between the second folding length L2 and the initial length L is as shown in the following formula:

$$L2 = L + 2\pi R/2 = L + \pi R$$

It can be known from the relation formula that, the larger the axis radius of the first pivot 113 is, the larger the sliding amount of the flexible display 120 along the first pivot 113 when being bent is, and if no elastic member 130 is arranged, the flexible display 120 will be stretched and deformed, and even be torn. In the foldable electronic device 100 of the present invention, as the elastic members 130 provide the flexible display 120 the extending flexibility when being unfolded or folded, no stretching and deformation, even tearing occurs when the flexible display 120 is bent.

Figure 3:
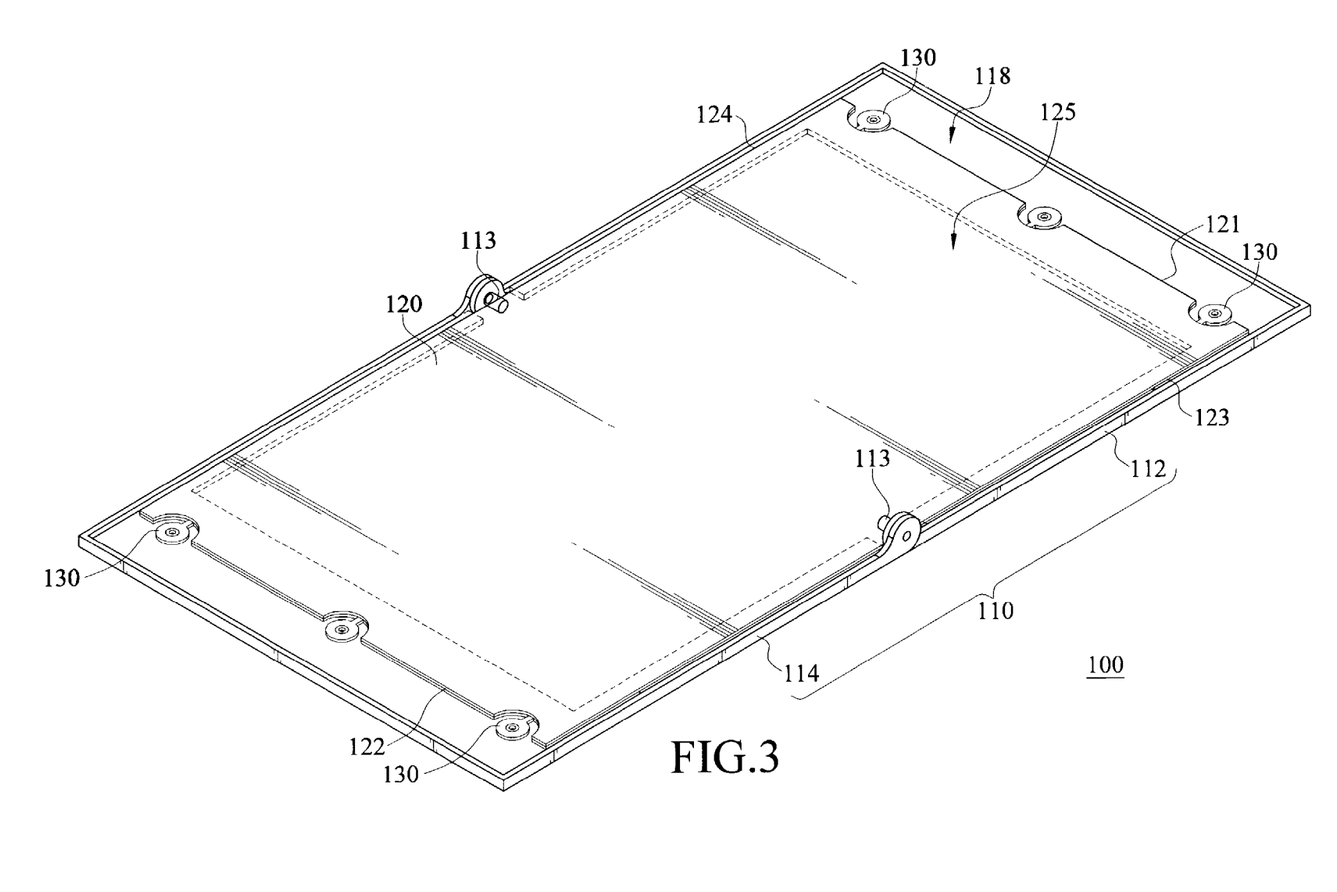
FIG. 3 is a schematic structural view of a foldable electronic device according to another embodiment of the present invention.

FIG. 3 is a schematic structural view of a foldable electronic device according to another embodiment of the present invention. As the structure of this embodiment is substantially the same as that of the embodiment in FIG. 1, only differences therebetween are described herein. A foldable electronic device 100 comprises a foldable casing 110, a flexible display 120, and six elastic members 130. The foldable casing 110 comprises a first casing body 112, a second casing body 114, and two first pivots 113. The flexible display 120 has a first edge 121, a second edge 122 opposite to the first edge 121, a third edge 123, and a fourth edge 124 opposite to the third edge 123. The first edge 121 and the second edge 122 are connected to the three elastic members 130 respectively. The elastic member 130 connected to the first edge 121 is fixed to the first casing body 112, and the elastic member 130 connected to the second edge 122 is fixed to the second casing body 114. The elastic members 130 provide the flexible display 120 extending flexibility when being unfolded or folded.

Figure 4:
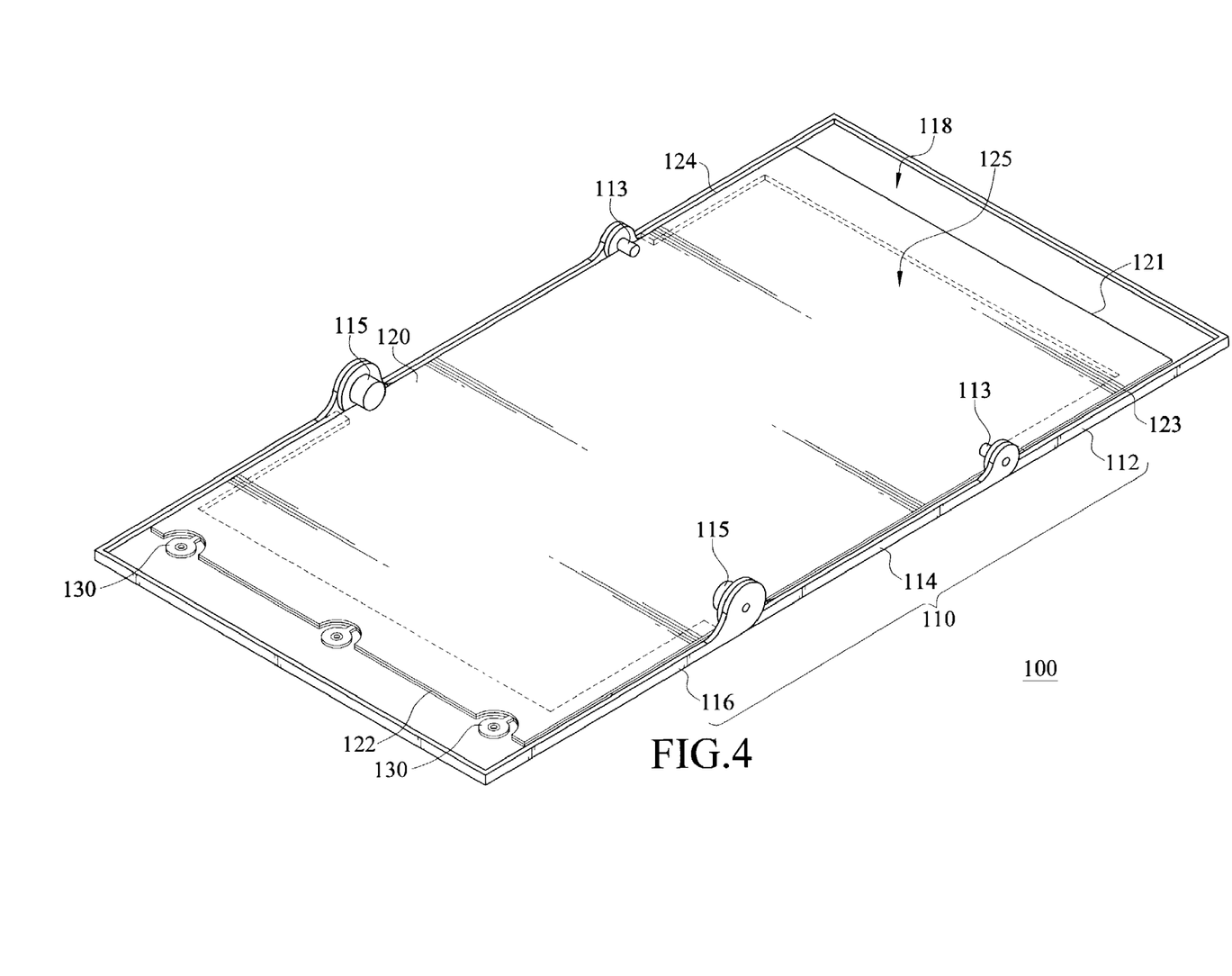
FIG. 4 is a schematic structural view of a foldable electronic device according to another embodiment of the present invention.

FIG. 4 is a schematic structural view of a foldable electronic device according to another embodiment of the present invention. As the structure of this embodiment is substantially the same as that of the embodiment in FIG. 1, only differences therebetween are described herein. A foldable electronic device 100 comprises a foldable casing 110, a flexible display 120, and three elastic members 130. The foldable casing 110 comprises a first casing body 112, a second casing body 114, a third casing body 116, two first pivots 113, and two second pivots 115. The first pivot 113 connects the first casing body 112 and the second casing body 114, such that the first casing body 112 and the second casing body 114 are capable of being unfolded or folded with respect to each other. The second pivot 115 connects the second casing body 114 and the third casing body 116, such that the second casing body 114 and the third casing body 116 are capable of being unfolded or folded with respect to each other. Moreover, when the first casing body 112, the second casing body 114, and the third casing body 116 are unfolded with respect to each other, a bearing range 118 is formed. Furthermore, the flexible display 120 is disposed on the bearing range 118. A first edge 121 of the flexible display 120 is connected to the first casing body 112, and a second edge 122 is connected to the three elastic members 130. One end of the three elastic members 130 is connected to the second edge 122 of the flexible display 120, and the other end is fixed to the third casing body 116. The elastic members 130 provide the flexible display 120 extending flexibility when being unfolded or folded.

Figure 5A:
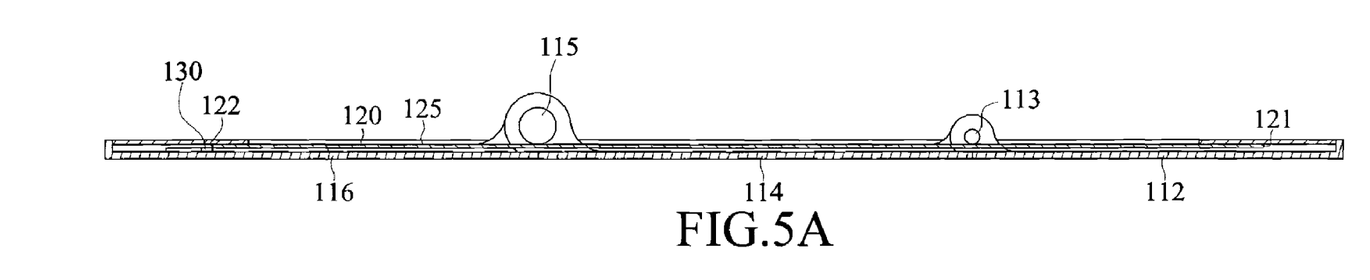
FIG. 5A is a plane cross-sectional view of the foldable electronic device in FIG. 4.
Figure 5B:
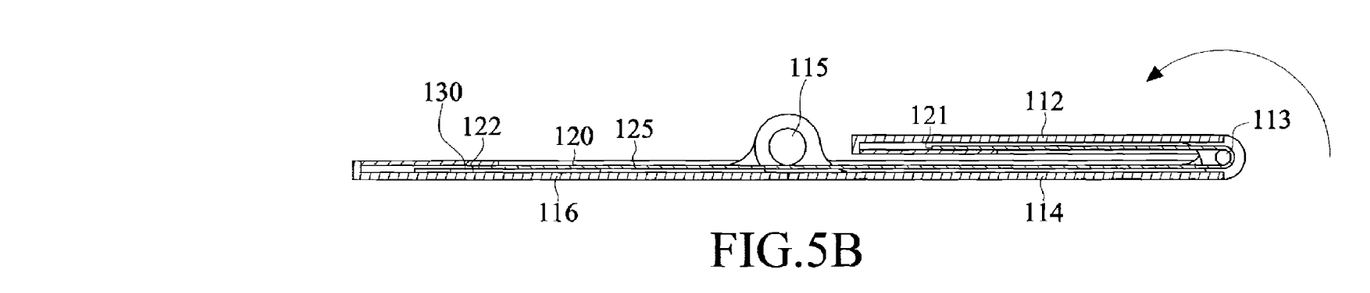
FIG. 5B is a schematic view of a first casing body in FIG. 5A folded to second casing body.
Figure 5C:
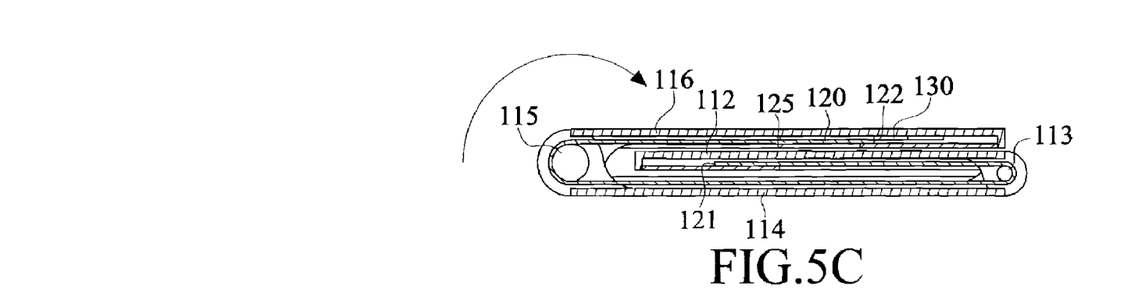
FIG. 5C is a schematic view of a third casing body in FIG. 5B folded to the first casing body.

FIG. 5A is a plane cross-sectional view of the foldable electronic device in FIG. 4, FIG. 5B is a schematic view of a first casing body in FIG. 5A folded to second casing body, and FIG. 5C is a schematic view of a third casing body in FIG. 5B folded to the first casing body. In the present invention, the embodiment in FIG. 4 is a two-folded foldable electronic device, which is folded in the following manner. The first casing body 112 rotates for 180 degrees counter-clockwise with respect to the second casing body 114, such that the first casing body 112 is laminated on the second casing body 114, as shown in FIG. 5B, and at this time, the flexible display 120 is bent and slides along the first pivot 113. Next, the third casing body 116 rotates for 180 degrees clockwise with respect to the second casing body 114, and is laminated on the first casing body 112, as shown in FIG. 5C, and at this time, the flexible display 120 is bent and slide along the second pivot 115. The elastic members 130 provide the flexible display 120 extending flexibility during the two times of bending.

Figure 6:
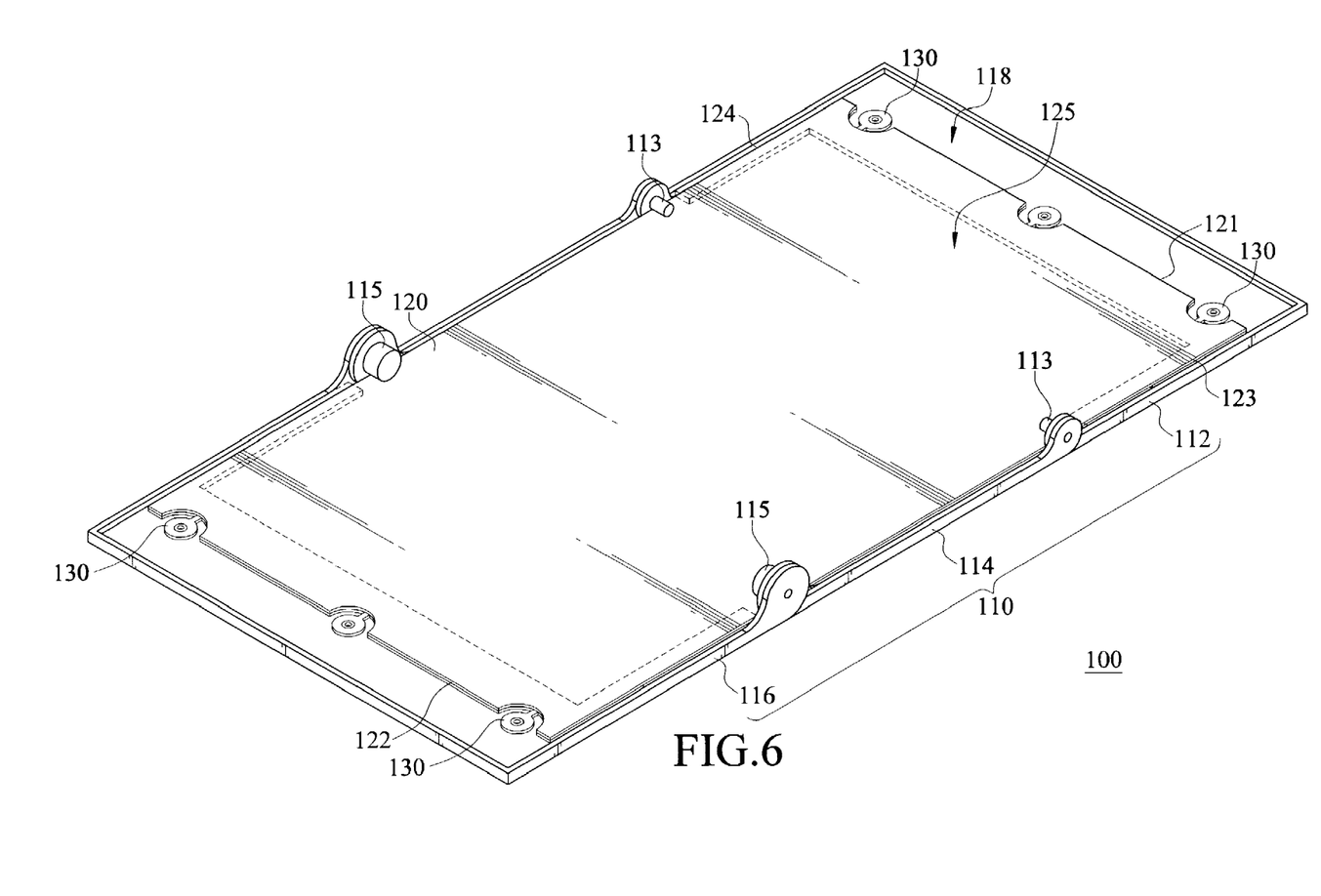
FIG. 6 is a schematic structural view of a foldable electronic device according to another embodiment of the present invention.

FIG. 6 is a schematic structural view of a foldable electronic device according to another embodiment of the present invention. As the structure of this embodiment is substantially the same as that of the embodiments in FIGS. 1 and 4, only differences therebetween are described herein. A foldable electronic device 100 comprises a foldable casing 110, a flexible display 120, and six elastic members 130. The foldable casing 110 comprises a first casing body 112, a second casing body 114, a third casing body 116, two first pivots 113, and two second pivots 115. The first pivot 113 connects the first casing body 112 and the second casing body 114, such that the first casing body 112 and the second casing body 114 are capable of being unfolded or folded with respect to each other. The second pivot 115 connects the second casing body 114 and the third casing body 116, such that the second casing body 114 and the third casing body 116 are capable of being unfolded or folded with respect to each other. Moreover, when the first casing body 112, the second casing body 114, and the third casing body 116 are unfolded with respect to each other, a bearing range 118 is formed. Furthermore, the flexible display 120 is disposed on the bearing range 118. A first edge 121 and a second edge 122 of the flexible display 120 are connected to the three elastic members 130 respectively. Furthermore, the elastic member 130 connected to the first edge 121 is fixed to the first casing body 112, and the elastic member 130 connected to the second edge 122 is fixed to the third casing body 116. The elastic members 130 provide the flexible display 120 extending flexibility when being unfolded or folded.

According to the foldable electronic device of the present invention, the flexible display is capable of being unfolded or folded together with the foldable casing. However, when being in a folded state, the foldable casing applies a stretching stress on the flexible display, thus forcing the flexible display to extend. A common flexible display does not have the extending flexibility, and thus, in the foldable electronic device according to the present invention, an elastic member is disposed to connect the flexible display and the foldable casing, so as to provide the flexible display the extending flexibility when being unfolded or folded. That is to say, the flexible display is enabled to have extensibility through the coordination of the elastic member, thus avoiding the risk of being pulled by the stress of the foldable casing and being torn and damaged. Therefore, the present invention solves the problems and applies the flexible display in the foldable electronic device to achieve the efficacy of having a minimal volume when being folded and having a maximal display screen when being unfolded.

What is claimed is:

1. A foldable electronic device, comprising:
   a foldable casing, capable of being unfolded or folded;
   a flexible display, disposed on the foldable casing, wherein the flexible display and the foldable casing are capable of being unfolded or folded together; and
   at least one elastic member, for connecting the foldable casing and the flexible display, so as to provide the flexible display extending flexibility when being unfolded or folded;
   wherein the foldable casing has at least two casing bodies, the two casing bodies are pivoted to each other, and are capable of being unfolded and folded with respect to each other, and when the two casing bodies are unfolded with respect to each other, a bearing range is formed, and the flexible display is disposed on the bearing range.

2. The foldable electronic device according to claim 1, wherein the number of the elastic member is two, and the two elastic members respectively connect two opposite ends of the foldable casing and the flexible display, so as to provide the flexible display the extending flexibility when being unfolded or folded.

3. The foldable electronic device according to claim 1, wherein the number of the casing bodies is three, the three casing bodies are capable of being unfolded and folded with respect to each other, and when the three casing bodies are unfolded with respect to each other, the bearing range is formed thereby, and the flexible display is disposed on the bearing range.

* * * * *